Oct. 19, 1965  R. WAELTZ  3,212,393
CONCAVE WASHER
Filed July 13, 1962
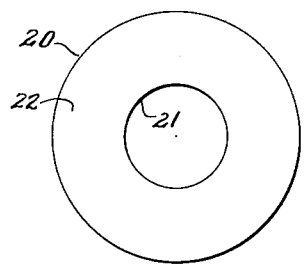
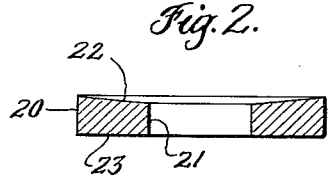
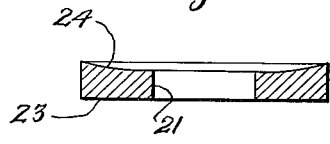
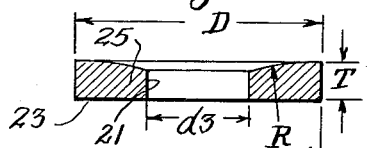
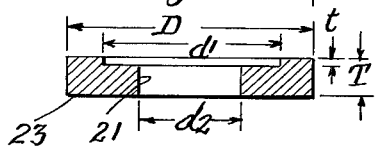
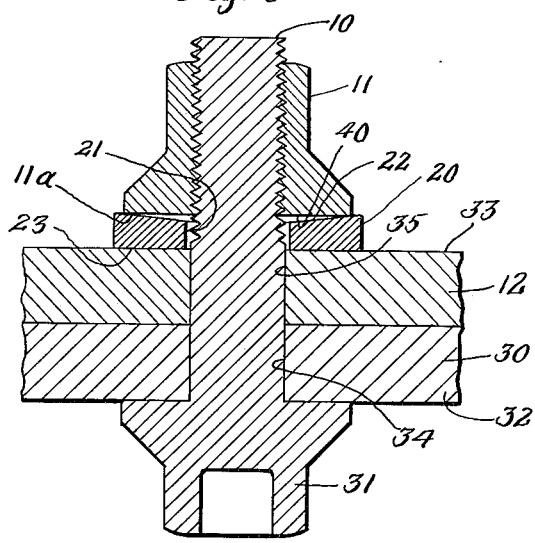
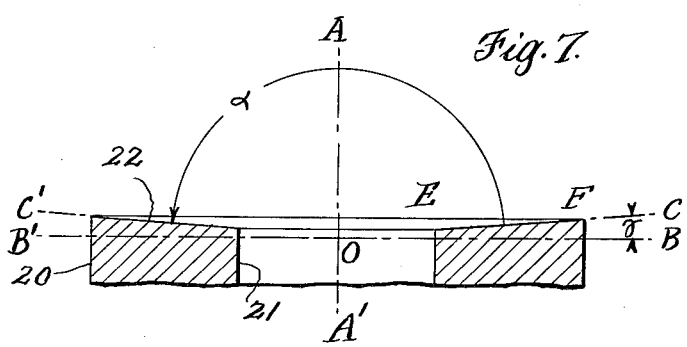
INVENTOR.
RONALD WAELTZ
BY
Synnestvedt & Lechner
ATTORNEYS United States Patent Office
3,212,393
Patented Oct. 19, 1965

3,212,393
CONCAVE WASHER
Ronald Waeltz, Hatboro, Pa., assignor to Standard Pressed Steel Co., Jenkintown, Pa., a corporation of Pennsylvania
Filed July 13, 1962, Ser. No. 209,700
3 Claims. (Cl. 85—50)

This invention relates to a new type of washer and to bolted structures employing such washers.

It is known that whenever male threads of a threaded fastener such as a bolt are engaged and loaded, the stress is not uniformly distributed over all of the engaged threads. The stress tends to concentrate on the threads nearest the bearing face of the nut. The stress concentration is greatest in the first few (2 or 3) threads adjacent the bearing face of the nut and from there rapidly decreases to the point where the threads in the upper nut portion carry very little load. The distribution of stress along the threads will be effected by the hardness of the material, by the total number of engaged nut threads, by the amount of material around the threads, by the modulus of elasticity of the materials in the nut and bolt threads, etc. For a given load, decreasing the number of engaged threads will increase the stress on the bottom threads because the stress per thread will be increased for all threads. Therefore, the stress in the bolt is greatly dependent upon the number of mating threads.

It is also known that the stress concentration exerts a decided influence on the fatigue life of threaded members, and that bolt failures normally occur at the point where the stress concentrations are the greatest.

Heretofore, various proposals have been made to relieve the stress concentration at threads nearest the bearing face and thereby extend the fatigue life. Such proposals have involved using special nut and bolt configurations (e.g., coning the bearing faces), using special thread forms (e.g., tapered threads) or by combinations of special configurations with special thread forms. When the conventional nuts and bolts are modified to give them the special configuration enabling the stress concentration to be relieved, the load carrying capability of the assembled nut and bolt will, in most instances, be adversely affected. For example, coning of the bearing face of a nut to enable it to undergo Belleville type deflection to a degree whereby it will relieve stress concentration due to nut engagement will also reduce the loading capability by about 20%.

Accordingly, it is one of the objects of this invention to provide means for relieving some of the stress concentrated at the roots of the threads immediately adjacent the nut bearing face when the nut is engaged and loaded, and to redistribute the stresses more uniformly over all engaged threads, and to accomplish this relief and redistribution while holding thread angularity at a minimum and without adversely affecting the load carrying capability of the engaged nut and bolt assembly.

It is another object of the present invention to provide means which can be used in conjunction with nuts and bolts—especially conventional nuts and bolts—and which will greatly increase the bolt fatigue life.

Other objects and advantages of the invention will be apparent in the detailed description of the invention and the drawings.

The objects of this invention are accomplished by means of a washer having a special configuration and by the interposition of such a washer in a bolted structure so that the engaged and loaded nut will bear against the specially configured portion of the washer. Essentially, the special configuration is one which controllably removes the compressive stresses on the nut face in the vicinity of the threads and it is also one which induces a controlled circumferential expansion of the bearing face of the nut when the nut is loaded. By removing the compressive stresses, the nut threads are allowed to elongate and follow the elongation of the bolt threads as a load is applied, thus giving a better thread match. By causing the bearing face to circumferentially expand, the nut threads nearest the bearing face will be partially disengaged thereby partially relieving the stresses in the threads adjacent the bearing face and redistributing them more uniformly on the other nut threads. A preferred embodiment of the special washer configuration contemplates providing the washer with a frusto-conic concave face, having a coning angle of the order of 172° to 176°. Other facial configurations such as radiused and stepped washers capable of removing the compressive stresses on the nut bearing face in the vicinity of the nut threads and inducing circumferential expansion of the bearing face of the nut to the same extent as a conic-concave washer having a coning angle of 172° to 176° can also be employed for purposes of relieving redistributing stress concentrations.

The details of how washers are made and used in accordance with this invention are described hereinafter with specific reference to the drawings in which:

FIG. 1 is a plan view of a disc type center opening washer.

FIG. 2 is a side view of washer in section.

FIGS. 3, 4 and 5 are side views in section of various embodiments of washers made according to the present invention.

FIG. 6 is a sectional view of a bolted structure employing the concave washer of this invention before loading of the nut and bolt.

FIG. 7 is a fragmentary view of a concave washer in sectional elevation to illustrate the meaning of certain terminology employed in the specification and claims.

FIG. 8 illustrates schematically the relative movements of the nut bearing face upon loading.

Referring now to FIGS. 1 and 2, there is illustrated a disc type washer 20, having a center opening, a concave face 22, and a flat face 23. In this particular embodiment, and as can be seen in FIG. 7, the concave face is a frusto-conic surface generated by the rotation of element EF about axis AA′ while maintaining a constant angularity of the order of 86° to 88° and thereby forming a cone or coning angle ($\alpha$) of the order of 172° to 176°, i.e., angle C′OC. Hereinafter, this surface will sometimes be referred to as a conic concave surface.

Where the washer does not have a flat face opposite the concave face, for example, if the surface contour of the work piece requires that the washer have a conformingly contoured bearing surface, the face angle ($\alpha$) is the angle between the concave face and, as illustrated in FIG. 7 a plane BB′ containing the cone vertex O which is perpendicular to the cone axis AA′ i.e., the angle COB. Where, as in the embodiment illustrated in FIGS. 1 and 2, the washer also has a flat face opposite the concave face, the angle between the flat face and the conic face is to be of the order of 2° to 4°—hereinafter this angularity is sometimes referred to as the "face angle."

In FIG. 6, there is illustrated a bolted structure assembled in accordance with the present invention. It includes a pair of aperture work pieces 12 and 30; a conventional nut 11, a conventional bolt 10, and a concave washer 22, made according to this invention. The shank of the bolt 10 passes through the aligned apertures 34 and 35 of the work pieces and the head 31 of the bolt bears on the surface 32 of the work piece 30. The bolt shank also passes through the center opening 21. The concave washer which is positioned so that the flat washer face 23 bears on the surface 33 of the work piece 12. The circumferential edge 11A of the nut 11 bears against the concave face 22 of the washer 20. As the nut is tightened the concave face 22 will cause the bearing face of the nut 40 to expand circumferentially and at the same time a few of the threads 13, 14 and 15 nearest the bearing face will become partially disengaged. The dotted lines 41, 42 and 43 in FIG. 8 illustrate in an exaggerated manner, the circumferential expansion and partial disengagement which occurs when the nut is tightened against the concave washer. It should be noted that the bearing face of the loaded nut extends into the cavity of the concave washer and thus provides an improved matching of the nut threads with the elongated bolt threads. It should also be noted that the circumferential expansion of the nut bearing face occurs without a corresponding contraction of the thread diameter at the free nut face 44.

For purposes of the present invention, the face angle constitutes a critical limitation. The face angle should be such that loading will cause the bearing face of the nut to expand circumferentially and thereby partially disengage the threads in the first three of four turns of threads in the nut, while holding thread angularity at a minimum and without circumferentially contracting the nut threads which are adjacent the free nut face. I prefer to employ a face angle of the order of 2° to 4°—and a 3° face angle has been found especially effective. If the face angle is greater than about 4°—e.g., 5° or more— the threads nearest the bearing face will, for practical purposes, become disengaged thereby shortening the effective nut length. The load will be distributed over fewer threads and actually will cause the stress concentration to increase and lower the fatigue life of the bolt. Where the face angle is less than about 2°, e.g., 1° or less, the circumferential expansion of the nut bearing face will not be sufficiently great to effect the degree of thread disengagement necessary to bring about an effective relief redistribution of the concentrated stresses.

Because of the relief and redistribution of the stresses in bolted structures made according to this invention; the fatigue life of conventional bolts is considerably enhanced. Bolt fatigue tests were carried out using washers constructed in accordance with the various embodiments of the present invention and were compared with assemblies made without washers, with plain washers and with washers having face angles outside the range prescribed by this invention.

In one series of tests, ⅜ inch bolts having 24 threads per inch heat hardened to 260,000 p.s.i. were used with 12 point nuts having a tensile strength of 260,000 p.s.i. Test assemblies made without washers and with 3° conic-concave washers as shown in FIG. 2; the bolted assemblies were tested on a 15,000 pound Krouse machine operating at 1050 c.p.m. Table I records the number of cycles to failure.

*Table I*

|     | Without Washer | 3° Washer |
|-----|----------------|-----------|
|     | 57,800         | 236,500   |
|     | 38,000         | 215,000   |
|     | 133,500        | 196,900   |
|     | 94,800         | 620,200   |
|     | 85,500         | 182,000   |
| Av__| 79,900         | 286,800   |

Another series of tests employed ¼ inch bolts (having a tensile strength of 260,000 p.s.i.) and 12 point nuts (heat treated to 260,000 p.s.i.). Bolted assemblies were made using no washers, plain washers, 1°, 3° and 5° conic-concave washers as in FIG. 5 (wherein $D=0.464''$, $d_1=0.354-8''$, $d_2=0.251-0.254''$, $t=0.0027''\pm0.0003''$ and $T=0.062''$) and radiused washers as in FIG. 4 (wherein $D=0.464''$, $d_3=0.260-5''$, $T=0.062$; and $R=0.955''$ centered on projected vertical edge of the washer). The bolted assemblies were tested on a 20,000 pound Amsler machine operating at 8000 c.p.m. Table II lists the average fatigue life in cycles at maximum and minimum stresses of 135,000 p.s.i.

*Table II*

|                    | Average cycles to failure |
|--------------------|---------------------------|
| No washer          | 75,000                    |
| Plain washer       | 151,300                   |
| 1°                 | 138,000                   |
| 3°                 | 3,863,000                 |
| 5°                 | 474,000                   |
| Stepped (FIG. 5)   | 751,000                   |
| Radiused (FIG. 4)  | 270,000                   |

With center opening disc type washers, when the cone axis of the frusto conic surface is coaxial with the axis of the opening the washer will act as a self aligning washer to accommodate angularity between the nut threads and bearing surface.

FIGS. 3, 4 and 5 illustrate other embodiments of so-called "concave" surfaced washers which act like the conic faced washer of FIG. 2 to relieve compressive stresses in the threads nearest the bearing face and more uniformly loading all threads by giving a better match of engaged thread surfaces. The dimensioning of the radiused washers of FIG. 3 (a washer with a spherically concave face 24, the spherical radius being centered on a line coaxial with the axis of the center opening) and FIG. 4 and the step of the stepped washer of FIG. 5 should be such that they will provide for circumferential expansion of the bearing face of an engaged nut comparable to that provided by a frusto conic face having a coning angle of the order of 172° to 176°.

I claim:
1. In a fastener assembly for clamping structural members together including a threaded bolt and a nut having a flat bearing face, the improvement comprising a center opening disc washer having a flat face and a frusto conical recessed face, the bearing face of the nut and the flat face of the washer being aligned in substantially parallel planes and the outer periphery of the bearing face of the nut engaging the conical face of the washer upon application of torquing forces to said nut and bolt, and wherein the angle between the conical face and an intersecting plane substantially parallel to the flat face of the washer is between 2° to 4°.

2. In a fastener assembly for clamping structural members together including a threaded bolt member and a nut having a flat bearing face, the improvement comprising a center opening disc washer having a flat face and a frusto conical recessed face, the bearing face of the nut and the flat face of the washer being aligned in substantially parallel planes and the outer periphery of the bearing face of the nut engaging the conical face of the washer upon application of torquing forces to said nut and bolt and wherein, the angle between the conical face and an intersecting plane substantially parallel to the flat face of the washer is 3°.

3. A fastener assembly including a threaded bolt member, a nut having a flat bearing face and a center opening disc washer, said washer surrounding the bolt and positioned between the nut and the face of a workpiece, said washer being characterized in that it has a frusto conical recessed face, the conical face of the washer being adapted to be drawn into engagement with the bearing face of the nut upon application of torquing forces to said nut and bolt, the coning angle of the conical face of the washer is from 172° to 176° and the center opening of the washer is coaxial with the cone axis of the conical face.

References Cited by the Examiner

UNITED STATES PATENTS

| | | | |
|---|---|---|---|
| 944,461 | 12/09 | Olander | 85—50 |
| 1,868,415 | 7/32 | Gundersen et al. | 85—50 |

FOREIGN PATENTS

| | | |
|---|---|---|
| 730,343 | 5/55 | Great Britain. |
| 857,495 | 12/60 | Great Britain. |

EDWARD C. ALLEN, *Primary Examiner.*